Figure 1:
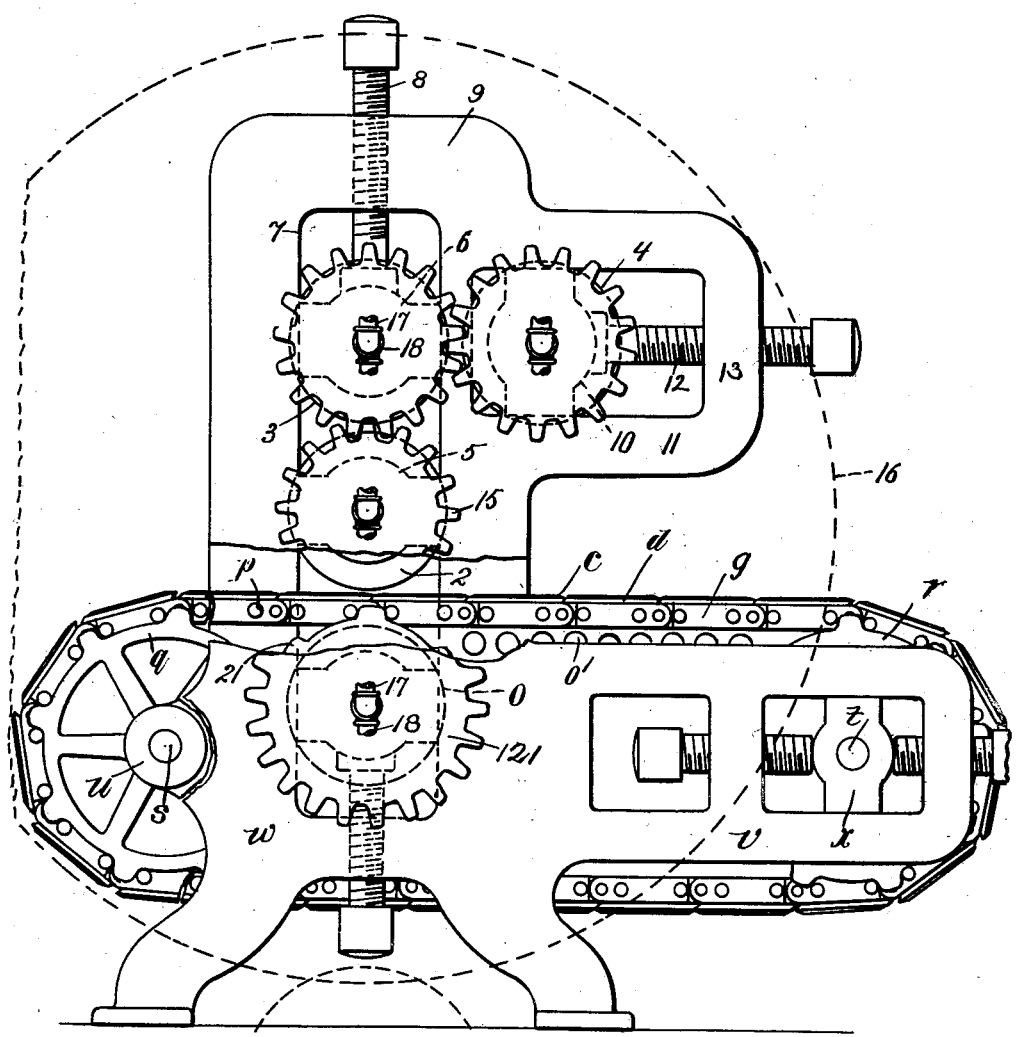

No. 835,522. PATENTED NOV. 13, 1906.
C. L. HIGGINS.
RUBBER CUTTING MACHINE.
APPLICATION FILED JAN. 19, 1905.

4 SHEETS—SHEET 1.

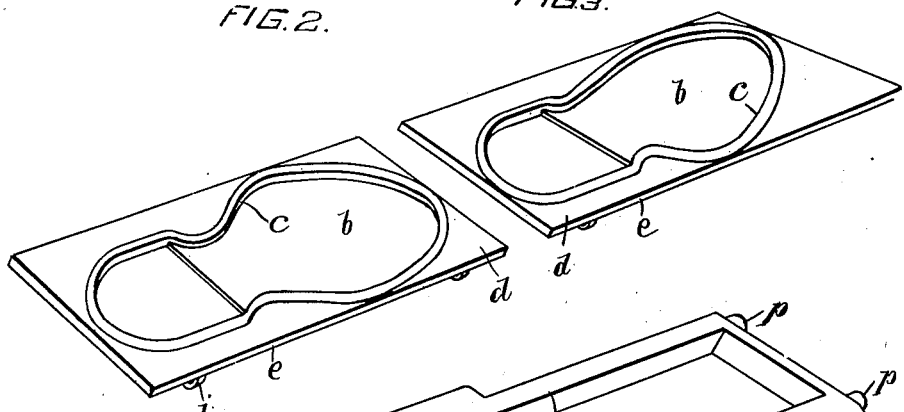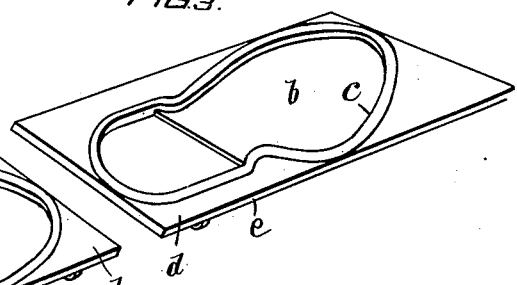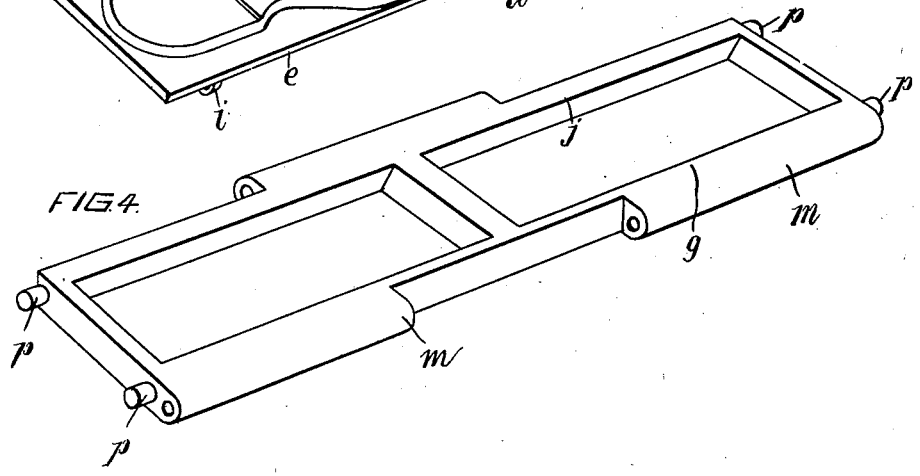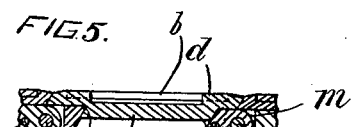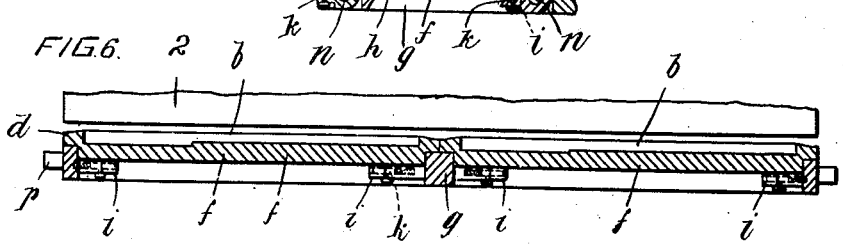

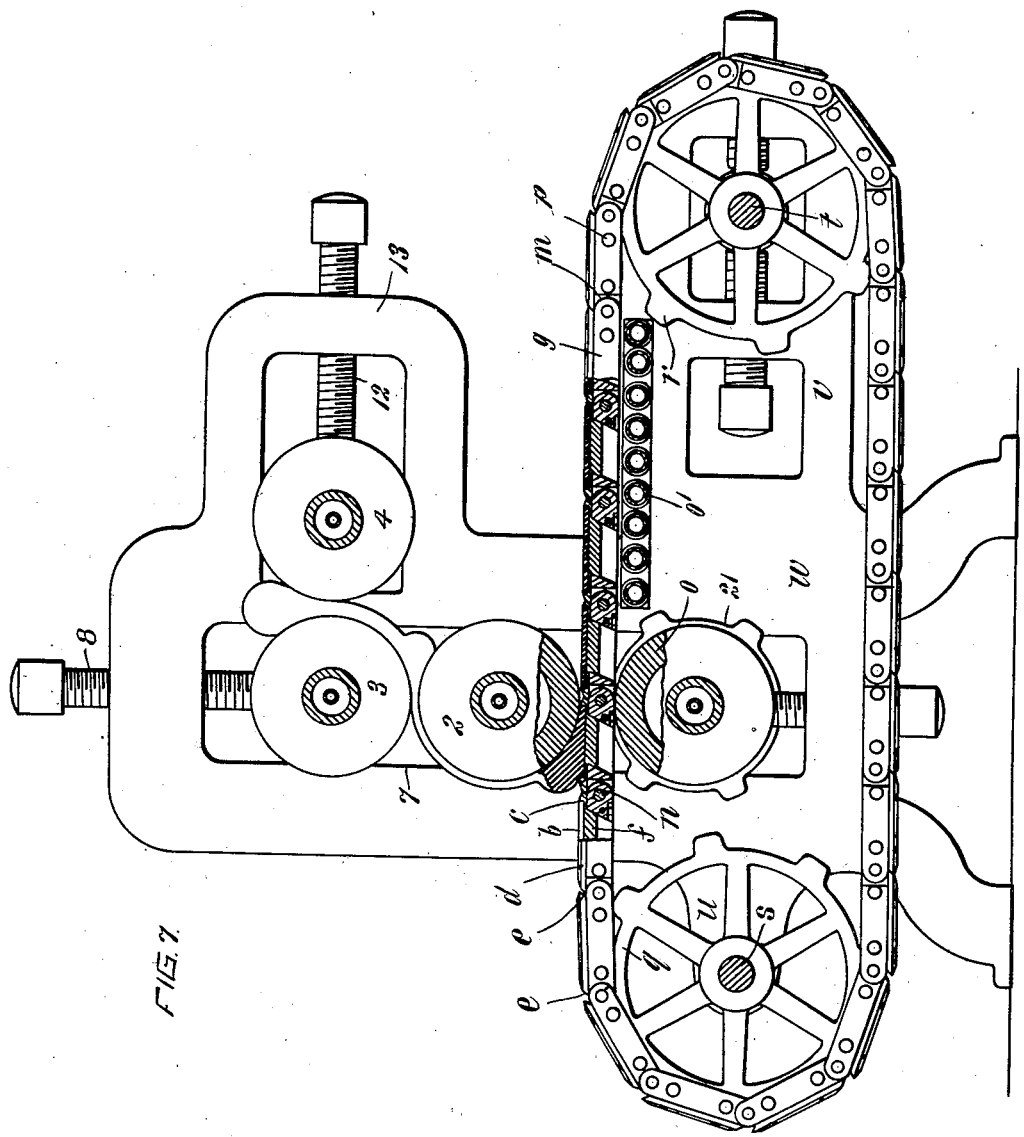

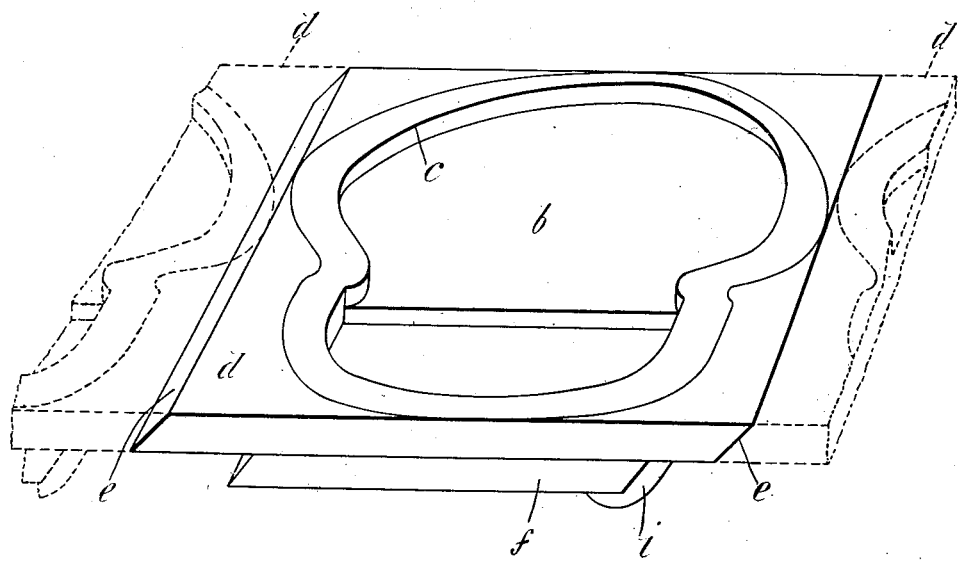

UNITED STATES PATENT OFFICE.

CHARLES LEANDER HIGGINS, OF MONTREAL, QUEBEC, CANADA.

RUBBER-CUTTING MACHINE.

No. 835,522.  Specification of Letters Patent.  Patented Nov. 13, 1906.

Application filed January 19, 1905. Serial No. 241,857.

*To all whom it may concern:*

Be it known that I, CHARLES LEANDER HIGGINS, of the city of Montreal, Province of Quebec, Canada, have invented certain new and useful Improvements in Machines for Forming Rubber Articles; and I do hereby declare that the following is a full, clear, and exact description of the same.

My invention has for its object to provide a machine by which uppers and soles or other members of articles of footwear or other articles of rubber can be produced.

My invention may be said, briefly, to consist of a machine for forming rubber articles from a mass of rubber stock in a semifluid state, such machine comprising a mold, means whereby the semifluid rubber stock is fed to and packed into the mold, and means whereby the mold and its contents are removed from the mass.

For full comprehension, however, of the invention reference must be had to the accompanying drawings, forming a part of this specification, in which like symbols indicate corresponding parts, and wherein—

Figure 1 is a side elevation, partly in section, of a rubber-cutting machine, constructed according to my invention. Figs. 2 and 3 are detail enlarged perspective views of a pair of my mold-plates. Fig. 4 is a similar view of one of the frames for carrying the mold-plates and constituting a part of a traveling table. Fig. 5 is a detail transverse sectional view of one of the mold-plate supporting-frames of the table with a mold-plate therein. Fig. 6 is a longitudinal vertical sectional view thereof, and Fig. 7 is a vertical sectional view of the machine, taken at right angles to the axes of the rolls and through the molds in the surface of the traveling table; and Fig. 8 is an enlarged perspective view of one of the mold-plates, portions of the two adjoining plates being shown in dotted lines, and illustrates particularly the adjoining beveled edges.

The main feature of my invention is the mold and presser-feed-roll, which conjointly form the article from a mass of stock fed to the mold and from which the articles are formed ready for use in the manufacture of other articles or individually—such, for instance, as soles molded from a mass of semifluid rubber-stock, ready to be applied to uppers, which may also be molded according to my invention ready for use—or rubber heels or other articles of rubber to be used individually may be also formed by my improved means.

My improved molds are preferably formed in a series of plates carried in a series of members hinged together in a loop to form an endless table, while the necessary pressure is imparted to the stock in the molds, and the feeding of such stock is performed by a presser-feed roll, between which and a suitable support or abutment such table is caused to travel.

The molds are indicated at $b$, and their edges are preferably slightly raised to provide slightly-protruding surrounding edges $c$. I prefer to form a pair of these molds (a right and a left) in each plate $d$ and arrange them in tandem.

Each mold-plate $d$ has its side edges $e$ correspondingly beveled in a plane extending upwardly away from the feed end of the table, and the lower edges of both sides and ends cut away to present a reduced bottom portion $f$, adapted to fit into the frame-like members of the table, while one side edge of this portion is formed with an angular recess $h$, and the opposite edge is formed with sockets $i$. These table members each consists of a preferably rectangular open frame $g$, one side of which is formed with an inwardly-projecting acute angular edge $j$, adapted to receive the recess $h$, while the opposite side of the frame is furnished with latches $k$, adapted to engage in the sockets $i$. The outside edge of each side is provided with knuckles $m$, adapted to register with knuckles upon the member next to it, and pintles $n$, inserted through the registering-knuckles, pivotally connect or hinge the members together, thus forming an endless table in the form of a loop, and the surface whereof when horizontal presents, outside of the matrices, an unbroken flat surface, owing to the beveled edges of each member fitting tightly upon the beveled edges of the members adjoining it. The table thus constructed is supported upon any preferred abutment, one presenting an antifriction-bearing being preferable, and as it is necessary to maintain the molds constantly at a sufficiently high temperature to soften the rubber to the required degree to be manipulated I utilize a heated roll $o$ and locate a series $o'$ of steam-coils beneath and in close proximity to the table. In order to drive the table, I furnish the ends of the members, and consequently the side edges of the table, with a series of pins $p$, and loop such table over two pairs of sprocket-wheels $q$ and $r$, respectively, the sprockets whereof engage the pins $p$. The wheels $q$ and $r$ are carried upon a pair of shafts $s$ and $t$, respectively, mounted to rotate freely in bearing-boxes $x$, mounted adjustably in bracket-arms $u$ and $v$, respectively, carried by the frame $w$ of my machine. These bearing-boxes are adjustable to enable excessive slack in the table to be taken up or the tension thereof to be otherwise varied at will.

The stock is fed and pressed into the molds by means of a series of calender-rolls 2, 3, and 4, the first (2) of which is the heated feed and presser roll before mentioned and is mounted in rigid boxes 5, while the rolls 3 and 4 are heated rolls, the roll 3 being mounted in adjustable bearing-boxes 6, located in a pair of guideways 7, constituting a portion of the frame of the machine and held with roll 3 in variable adjacency to the presser-feed roll 2 by a pair of screws 8, taking through threaded openings in cross-pieces 9, closing the upper ends of the guideways and bearing at their lower ends upon the bearing-boxes 6. The roll 4 is preferably arranged to one side of the roll 3 in order to allow of the adjustment of such latter roll, and this roll 4 is also adjustably mounted. It is mounted in a pair of bearing-boxes 10, mounted in turn adjustably in a pair of laterally-projecting guiding frames or brackets 11, and a pair of adjusting-screws 12, carried in tapped openings in cross-pieces 13 at the outer ends of such guiding-frames or brackets, serve to retain roll 4 (carried by the boxes 10) in variable adjacency to the roll 3.

The rolls are rotated by means of a series of gear-wheels 15, mounted rigidly upon the trunnions thereof and receiving movement from a gear 16, driven by a main driving-gear 14, and such rolls are heated, preferably, by steam taken from any suitable generator (not shown) and fed to the interior of the rolls through pipes 17, coupled to the trunnions (which are tubular) by suitable swivels 18. A pair of pinions 21, mounted rigidly upon the ends of the supporting-roll $o$, intermesh with the pins and impart movement to the table independently of the influence of the feed-roll 2. A pair of gears 121, (one of which is shown,) mounted upon the opposite trunnion of roll $o$, outside of the machine-frame, intermesh with gears 15, and thus transmit power to the gears 21 and the table.

My object in beveling the edges of the table members at an angle, as shown, extending upwardly away from the feed end of the table is to prevent stock being forced between such edges.

I have not given a detail description of the construction of the calender-rolls, their bearings, nor the manner in which they are heated, because such features specifically form no part of my invention and are common to all calenders utilized with engraved rolls in the manufacture of rubber footwear and the like.

Operation: The operation of my improved machine for molding articles of rubber from a mass of rubber stock in a semifluid state is as follows: The semifluid (soft unvulcanized) rubber is fed to rolls 4 and 3, and from the latter to roll 2 and the molds in the manner usual in the feeding of rubber to an engraved roll. If desired, the gears may be constructed to impart a sufficiently higher surface speed to feed-roll 2 than to the table to create a slight rubbing action between such parts, although such is only required under certain conditions. As the members of the table leave the feed-roll they take with them only the stock pressed or packed into the molds, the balance remaining on the feed-roll, and an operator picks the complete soles, uppers, or heels, as the case may be, from the table.

Although I have illustrated a machine constructed according to my invention and adapted to the forming of soles for rubber footwear, I do not confine myself to such embodiment, as my invention with different shapes of molds can be applied to advantage to the forming of any other rubber articles at present cut by hand or formed in any way by manual labor.

I do not herein claim the method or process disclosed, as same may form the subject-matter of a divisional application.

What I claim is as follows:

1. In a machine for forming the parts of rubber footwear from a mass of rubber stock in a semifluid state, the combination of a movable member having a mold, a combined feed and presser roll, means for rotating such roll, means for moving the movable member into position to be borne upon by the roll and then moved away from such position for the purpose of causing the mold to be packed with the semifluid rubber stock and the contents thereof to be separated from the mass, and means whereby the roll and mold are heated.

2. In a machine for forming the parts of rubber footwear from a mass of rubber stock in a semifluid state, the combination of a table having a mold, a combined feed and presser roll, means for rotating such roll, means for moving the table into position to be borne upon by the roll and then moved away from such position for the purpose of causing the mold to be packed with the semifluid rubber stock and the contents thereof to be separated from the mass, and means whereby the roll and mold are heated.

3. In a machine for molding the parts of rubber footwear, the combination of an endless flat table having a series of molds therein, a combined feed and presser roll adjacent to the table and adapted to feed a mass of rubber in a semifluid state to one of the molds and simultaneously press the same into such mold, means for rotating such roll and means for rotating the table.

4. In a machine for molding the parts of rubber footwear, the combination of an endless flat table having a series of molds therein, a combined feed and presser roll adjacent to the table and adapted to feed a mass of rubber in a semifluid state to one of the molds and simultaneously press the same into such mold, means for rotating such roll and means for rotating the table at a speed different from that of the feed and presser roll.

5. In a machine for molding the parts of rubber footwear, the combination with an endless table, means for supporting the table, means whereby the table is moved, a series of molds formed in the surface of the table, a combined feed and presser roll mounted above and adjacent to the table in vertical line with the supporting means, and means for feeding rubber stock in a semifluid state to the space between the roll above the table and the surface of the table such roll being adapted to feed the stock under pressure from the said space into the mold.

6. In a machine for forming the parts of rubber footwear, the combination with an endless table, means for supporting the table, means whereby the table is moved a series of molds formed in the surface of the table, a roll mounted above and adjacent to the table in vertical line with the supporting means, means for adjusting the supporting means relatively to the roll above the table, and means for feeding rubber stock in a semifluid state to the space between the roll above the table and the surface of the table.

7. In a machine for forming the parts of rubber footwear, the combination with a machine-frame supporting sprocket-wheels and a supporting-roll, an endless table looped around such sprocket-wheels and having a series of gear-teeth upon its under side, a pinion carried by the roll and intermeshing with the gear-teeth, a series of molds formed in the surface of the table, a roll mounted above and adjacent to the table in vertical line with the supporting-roll, means for adjusting the supporting-roll relatively to the roll above the table and means for feeding rubber stock in a semifluid state to the space between the roll above the table and the surface of the table.

8. In a machine for forming the parts of rubber footwear, the combination with a machine-frame supporting sprocket-wheels and a supporting-roll, an endless table looped around such sprocket-wheels and having a series of gear-teeth upon its under side, a pinion carried by the roll and intermeshing with the gear-teeth, a series of molds formed in the surface of the table, a roll mounted above and adjacent to the table in vertical line with the supporting-roll, means for adjusting the supporting-roll relatively to the roll above the table, a series of calender-rolls for feeding rubber stock in a semifluid state to the roll above the table, and means whereby the rolls are heated.

9. In a machine for forming the parts of rubber footwear, the combination with a presser-roll, of a movable member having a series of molds the surface of the portion of such member between the molds inclining downwardly away from the surrounding edge of the latter at a slight angle to and merging into the remaining surface of the member, means for feeding a mass of stock in a semifluid state to the mold, and means for simultaneously exerting a pressure upon the contents of the mold and the protruding surrounding edge.

10. In a machine for forming articles from a mass of rubber stock in a semifluid state, the combination with means for feeding the semifluid mass, of a traveling table consisting of a plurality of plates each with a mold in one surface thereof, such plates having their side edges adjacent to one another and correspondingly beveled in a plane extending upwardly away from the feed end of the table for the purpose of preventing the semifluid mass being forced between the said plates, means for connecting the plates together, and means for supporting the table.

11. In a machine for forming the parts of rubber footwear, the combination with rolling means for feeding the rubber stock in a state in which it is adapted to flow under pressure, of means coacting with a member and having an action wiping across the surface of such member for founding a cast of the said part of rubber footwear from the said stock and for separating the founded part from the mass.

In testimony whereof I have signed my name to this specification in the presence of two subscribing witnesses.

CHARLES LEANDER HIGGINS.

Witnesses:
WILLIAM P. McFEAT,
FRED J. SEARS.